Dec. 31, 1935.  J. GELL  2,025,856

GRAMOPHONE

Filed June 12, 1933  4 Sheets-Sheet 1

Inventor
John Gell

Dec. 31, 1935.   J. GELL   2,025,856
GRAMOPHONE
Filed June 12, 1933   4 Sheets-Sheet 2

Inventor
John Gell

Dec. 31, 1935.　　　　　J. GELL　　　　2,025,856
GRAMOPHONE
Filed June 12, 1933　　　4 Sheets-Sheet 3

Inventor
John Gell

Dec. 31, 1935.　　　　　J. GELL　　　　2,025,856
GRAMOPHONE
Filed June 12, 1933　　　4 Sheets-Sheet 4

Inventor
John Gell

Patented Dec. 31, 1935

2,025,856

UNITED STATES PATENT OFFICE 2,025,856

GRAMOPHONE

John Gell, London, England

Application June 12, 1933, Serial No. 675,490
In Great Britain June 13, 1932

10 Claims. (Cl. 74—393)

This invention has reference to an improved form of drive for gramophone mechanism and the like. Gramophones now generally in use have a form of drive so that the record discs revolve at a uniform angular speed. Therefore the tonal length of the output is equal whether the needle is over the outer or inner position of the record. If the travel of the record when the needle is over the inner position is sufficient to give a suitable tonal effect, then the excessive travel when the needle is at the outer position is unnecessary and detrimental to both the needle and the record. Attempts have been made to so regulate the speed of the discs that a uniform length of record travels under the needle in a given time whether the needle is at the outer or inner position over the disc. This necessitates a form of drive that will ensure the lowest angular speed of the record consistent with the tonal effect when the needle is in position over the outer end of the record. As the record continues to rotate the speed of the record is gradually increased so that the actual linear travel of the record under the needle is equal during the same time interval. This enables a much longer record to be obtained for the same diameter disc, lessens the wear of the needle and record and lessens the scratching noise of the friction between the needle and record.

By the proper use of controls to be described I obtain the following results. When using existing standard records I raise the main driving disc from the main drive wheel by means of the right hand shaft, and by means of the left hand shaft disengage the rocking arm half nuts from the threaded shafts and move the rocking arm almost to the limits of its position near the centre and clamp it in this position by means of a locking screw on the front panel of the machine, which engages with the sliding rods associated with the rocking arm. I then lower the driving disc on to the driving wheel by giving the right hand rod a half turn. The electrical current is then switched on and the table is rotated at an even speed. When using differential records I move the rocking arm to its outer position, engage the half nuts by giving the eccentric shaft a half turn, lower the driving disc, and switch on the electrical current. The electrical current can be switched off at any time, but when the rocking arm reaches almost the limit of its inner travel the special circuit breaking action comes into operation.

I do not limit my apparatus for use with an electric motor; it is so designed that the main drive can be attached to a spring or other drive started and stopped in the well known manner.

My invention will be clearly understood from the following description aided by the accompanying drawings in which:—

Figure 1:
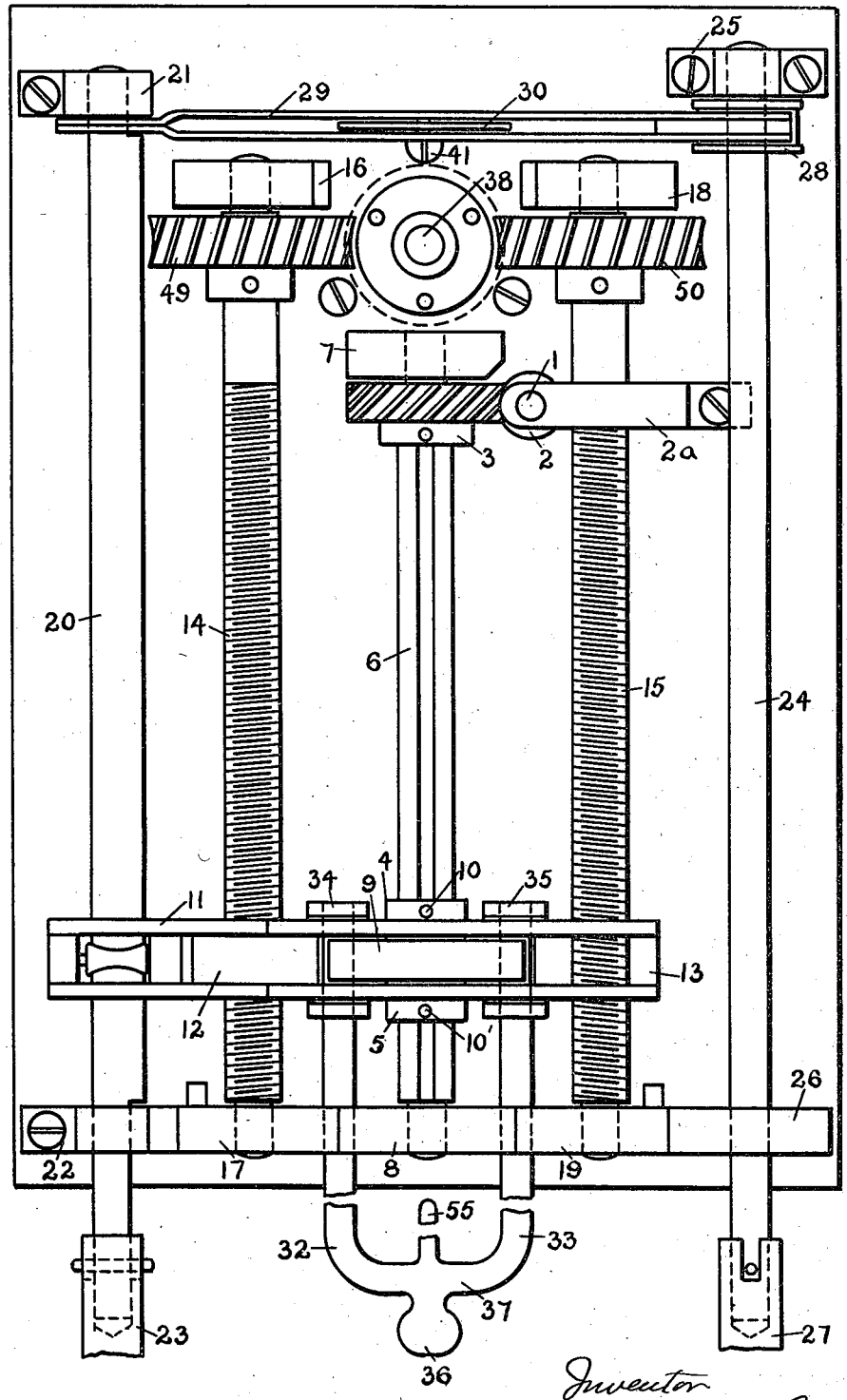
Fig. 1 is a plan view of the machine with the main driving disc removed.

In using this apparatus it is essential that the rocking arm 11 may be easily placed in a definite position when it is desired that the rotation of the turntable 31 shall continue at an even speed, or be brought to the outer position to be engaged with the threaded shafts 14 and 15 to carry the rocking arm 11 steadily towards the centre. Provision is made for this object by utilizing the eccentrically pivoted shaft 20, the sliding rods 32 and 33 and the shaft 24, the provision of the raising and lowering of the turntable 31 being through the sliding fit of the inner races of ball bearings 43 and 44 on the main pivot 38. The different movements are given by using the several actions now described in detail, either separately or jointly.

Figure 4:
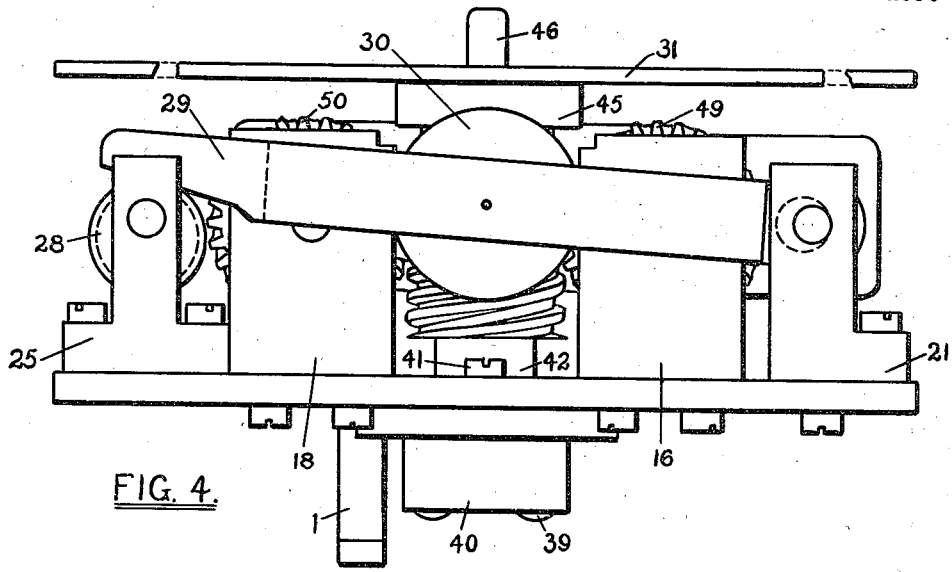
Fig. 4 is an end elevation of the machine.
Figure 5:
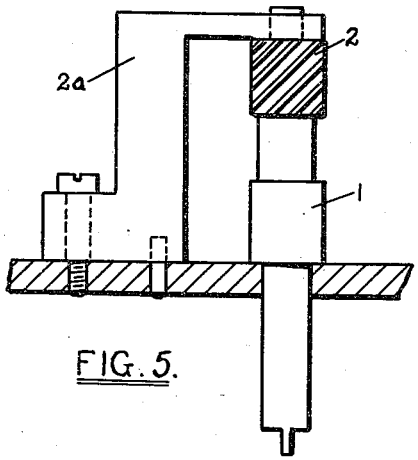
Fig. 5 is an elevation of the transmission drive.
Figure 6:
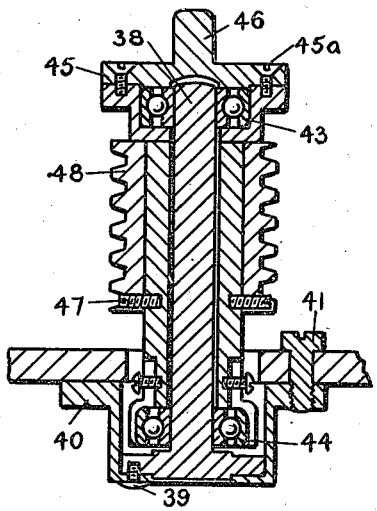
Fig. 6 is a sectional elevation of the main pivot and gearing.
Figure 11:
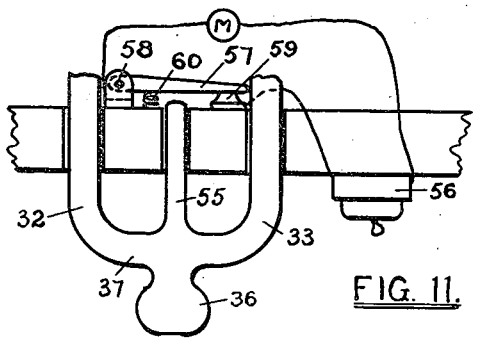
Fig. 11 is the circuit breaking attachment.
Figure 8:
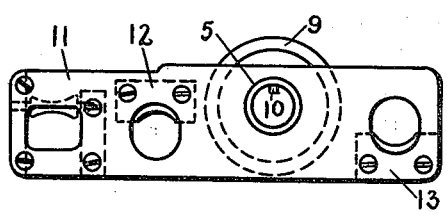
Fig. 8 is a side elevation of the rocking arm.
Figure 10:
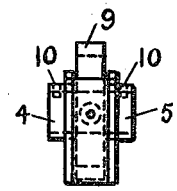
Fig. 10 is an end elevation of the rocking arm.
Figure 9:
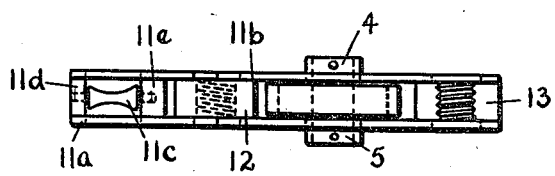
Fig. 9 is a plan of the rocking arm.

In Figs. 1 and 5, 1 is the main drive passing through the main plate 1a with its upper pivoted end supported by bracket 2a and with its lower end formed to fit into the main drive of a motor, and 2 the spiral gear forming part of shaft 1. In Fig. 1 spiral gear 2 engages with the driven wheel 3, which is fixed to splined shaft 6 carried on bearings 7 and 8. Splined shaft 6 carries an intermediate rubber faced drive wheel 9, free to slide longitudinally on splined shaft 6, but driven by means of pins 10, 10′ fixed to the bosses 4 and 5, forming an integral part of wheel 9 and so positioned that they are the driving elements of wheel 9 whilst permitting it to travel longitudinally along the splined shaft 6. In Figs. 1 and 8, 11 is the rocking arm free to rotate and travel along splined shaft 6. This rocking arm is formed of two main side pieces 11a and 11b assembled together by means of spacing pieces 12 and 13, shown clearly in Figs. 8 and 9, and of such a width as to permit drive wheel 9 to rotate freely between the side pieces 11a and 11b. Spacing pieces 12 and 13 are so formed and positioned that they form half nuts that can engage with threaded shafts 14 and 15, carried on bearings 16 and 17, 18 and 19 respectively. The rocking arm 11 can be partly rotated with shaft 6 as the centre of rotation, half nut 12 being caused to engage or disengage with threaded shaft 14 on its upper side, and at the same time the half nut 13 engages or disengages with threaded shaft 15 on its under side. This action is obtained by means of shaft 20, eccentrically pivoted on bearings 21 and 22 with extension arm 23 extending to the front of the machine, and by means of a handle, shaft 20 may be given a turn to the right or left. In one position of shaft 20 the spacing pieces 12 and 13 engage with shafts 14 and 15 and in the reverse position the cam action of shaft 20 lifts the half nut spacing pieces 12 and 13 clear of their respective shafts 14 and 15. Incorporated in the rocking arm is roller 11c pivoted in spacing pieces 11d and 11e to enable the rocking arm 11 to travel more easily along the splined shaft 6. 24 is a shaft carried parallel to the others on bearings 25 and 26 with extension 27 to the front of the machine. At its opposite end it carries an eccentrically pivoted cam 28, more clearly shown in Fig. 4, which when the shaft 24 is given a half turn actuates girder 29 carrying wheel 30, and pivoted on the remote pivot of shaft 20, and thus raises the main disc 31 with its associated mechanism as indicated in Fig. 6. The traversing movement of the rocking arm is obtained through the sliding rods 32 and 33. Fixed to these rods are U pieces 34 and 35, in such a manner that the rocking arm can be traversed to and fro and at the same time permitted to rock. The rods 32 and 33 are connected together outside the case so that they can be actuated by one knob 36. The uniting cross piece 37 is so fixed that it controls an electrical circuit breaking key in order that when the rocking arm has been traversed almost to its most central position the cross piece 37 breaks the electrical circuit.

Figure 2:
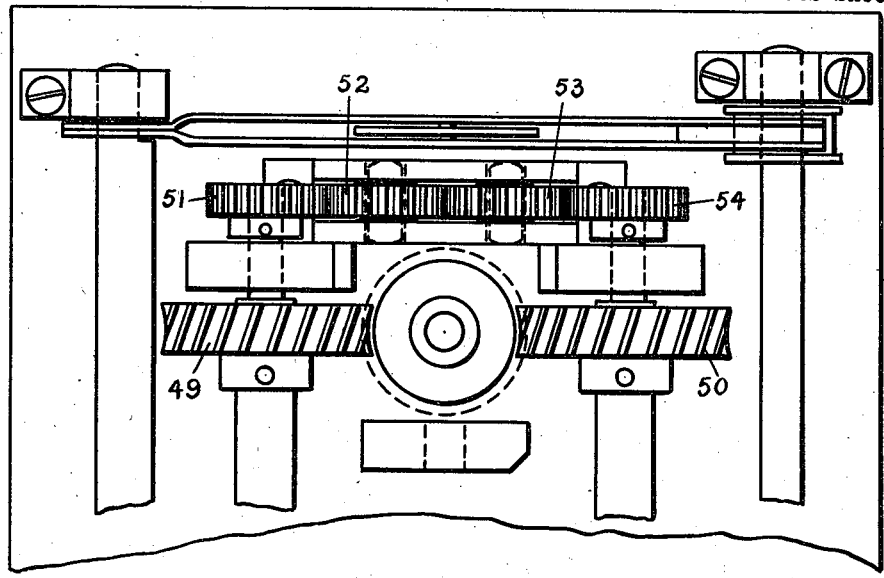
Fig. 2 is a plan view of the transmission gearing.

The drive of the machine is obtained in the following manner as shown clearly in Fig. 6. 38 is the central pivot fixed by means of screws 39 to the cup shaped cap 40, which in turn is fixed to the under side of the main base plate 1a by screws 41. Carried on the main pivot 38 is a vertical hollow shaft 42 carrying ball bearings 43 and 44 which rotate on pivot 38. To enable the vertical hollow shaft 42 to rise and fall on the main pivot 38 the inner races of the ball bearings 43 and 44 are a sliding fit on the main pivot 38. By this means the under face of the turntable 31 rests on the rubber faced drive wheel 9 and also permits the turntable 31 to be raised free from the drive wheel 9. The hollow shaft 42 is capped by a disc 45 with its central circular projection 46. Projection 46 is used to centralize the turntable 31 fixed to cap 45 by means of screws 45a. To the outer face of the vertical shaft 42 is firmly fixed by screws 47, a four start worm gear 48 which engages with the right and left handed gears 49 and 50, fixed on shafts 14 and 15 respectively. In Fig. 2, is shown an additional train of gears 51, 52, 53 and 54 to maintain shafts 14 and 15 in their normal relative positions and to facilitate the correct engagement of the half nuts 12 and 13. When the turntable 31 with its associated worm gear 48 is raised for any purpose and then replaced the train of gears 51, 52, 53 and 54 maintain gears 49 and 50 in their correct relative positions.

Figure 3:
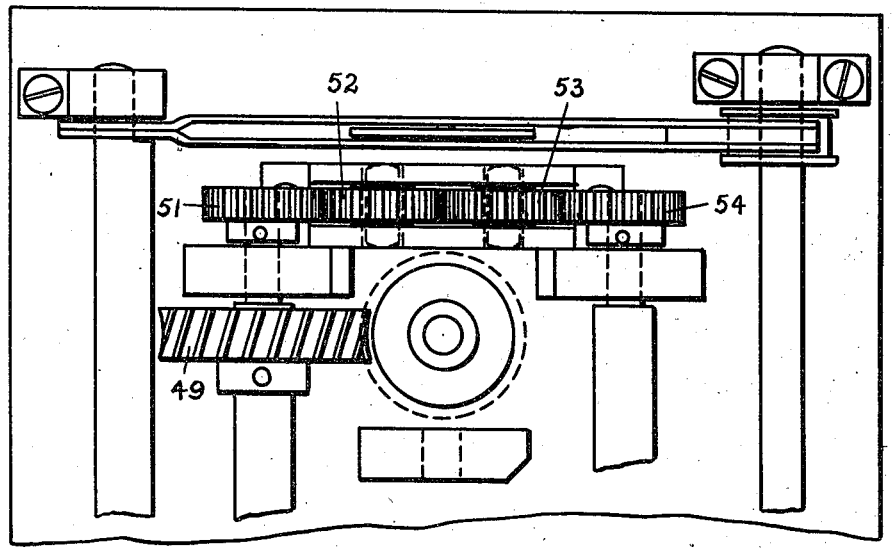
Fig. 3 is an alternative plan of Fig. 2.

In Fig. 3, is shown the same train of gears 51, 52, 53 and 54, but with the gear wheel 50 removed. When in this position the drive of the shafts is from the worm gear 48, through gear wheel 49, and through the train of gears 51, 52, 53 and 54 to shaft 15.

In Fig. 1, on cross piece 37 is a projection 55 for the purpose of cutting off the electrical current when the rocking arm has travelled almost to its inner position. In Fig. 11, is shown a small section of the outer case of the gramophone, and the outer ends of the sliding rods 32 and 33, with cross piece 37 and knob 36. On the outer face of the case of the gramophone is fixed the ordinary type of electrical circuit closing switch 56. On the inner face of the case and suitably positioned in association with the projection 55, is a circuit closing key 57. One end of the key lever 57 is pivoted at 58, and the other end rests on the key contact 59, with spiral spring 60 normally causing the electrical circuit to be closed. The electrical circuit is from key lever 57, through the motor, through the switch 56 to the lower key contact 59. When the apparatus is at rest the electrical circuit is broken at switch 56. When switch 56 is closed the motor is brought into operation and the rocking arm travels toward the centre of the machine. The circuit can be broken at any time when the switch 56 is operated in the usual manner, but if the circuit remains closed, when the rocking arm almost reaches its most inner position projection 55 comes in contact with key lever 57 and breaks the electrical circuit.

Figure 7:
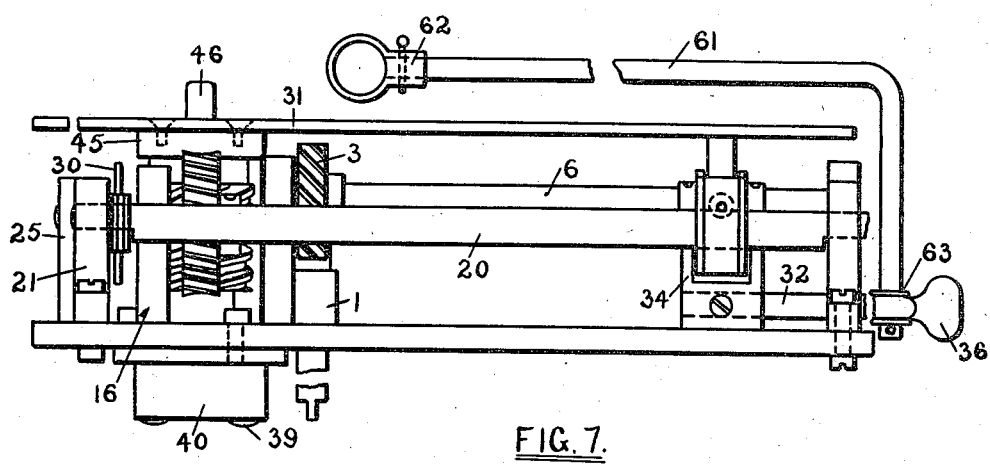
Fig. 7 is a side elevation of the machine.

In Fig. 7, 61 is the L shaped arm which can be readily attached to the tone arm to enable records to be recorded. When making a record, a disc of wax or other material is placed on the turntable. The sound box is removed from the tone arm and a cutting stylus associated with the usual sound recording apparatus replaces the sound box. The L shaped arm 61 is attached to the tone arm with a flexible connection at 62, and with the L shaped arm 61 free to rotate axially at 63, where it is attached to the U shaped part 37. The rocking arm is moved to its outer limits, the motor is started and the vocal or musical sounds transmitted to the recording apparatus at the end of the tone arm.

I claim:

1. In or for use with a sound recording or reproducing machine of the disc type, mechanism for varying the speed of rotation of the disc supporting turntable in accordance with the movement of the stylus over a disc on the turntable so that the linear speed of the disc under the stylus shall be constant, such variable speed mechanism comprising a friction wheel supported below the turntable upon a splined shaft positioned radially, and in a line with the under face of the turntable, characterized in that there is associated with the splined shaft and friction wheel a rocking arm having two members carrying therebetween the friction wheel and at each end half nuts which when the rocking arm with the splined shaft as a centre is rocked in one direction the half nuts engage with threaded shafts parallel to the splined shaft one on each side thereof, and when rocked in the other direction the half nuts are free from the threaded shafts.

2. In or for use with a sound recording or reproducing machine of the disc type, variable speed mechanism as claimed in the preceding claim comprising a means whereby said splined shaft may be operatively connected with the driving motor, and end bearings for said spline shaft one positioned near the centre of the machine and the other at an outer position so as to afford travel of the friction wheel to the full extent of the radius of the turntable as described.

3. In or for use with a sound recording or reproducing machine of the disc type, variable speed mechanism as claimed in claim 1, comprising means for positioning the turntable so that it may rest upon or be raised from the friction wheel and a worm gear associated with the turntable and controlling the movement of the two threaded shafts carried parallel to the splined shaft as described.

4. In or for use with a sound recording or reproducing machine of the disc type, variable speed mechanism as claimed in claim 1, in which the rocking arm is at right angles to the splined shaft and the half nuts are firmly fixed thereto positioned one above and the other below the threaded shafts geared to the turntable as described.

5. In or for use with a sound recording or reproducing machine of the disc type, variable speed mechanism as claimed in claim 1, comprising an eccentrically pivoted shaft engaging with the arm to raise or lower the rocking arm upon rotation of the shaft so as to cause it to engage or to be disengaged from the pair of threaded shafts.

6. In or for use with a sound recording or reproducing machine of the disc type, variable speed mechanism as claimed in claim 1, wherein a shaft is carried in a line with the other shafts provided with an actuating handle at one end and fitted with a cam at the opposite end and means connecting the cam with the turntable so that upon giving the shaft a half turn the turntable is raised from contact with the friction wheel as described.

7. In or for use with a sound recording or reproducing machine of the disc type, variable speed mechanism as claimed in claim 1, comprising a pair of sliding rods, one on each side of the splined shaft and each having U-shaped pieces loosely engaging over the rocking arm, and a connecting portion uniting said pieces, the longitudinal location of said pieces indicating the radial position of the rocking arm.

8. In or for use with a sound recording or reproducing machine of the disc type, variable speed mechanism as claimed in claim 1, comprising an electrical circuit breaker and a pair of sliding rods loosely attached to the rocking arm and united at their outer ends and having means whereby in addition to controlling the position of the rocking arm when disengaged from the threaded shafts they also act on said circuit breaker as an automatic cut off to the electrical circuit of the driving motor when the rocking arm has been carried almost to the extent of its inner travel as described.

9. In or for use with a sound recording or reproducing machine of the disc type, variable speed mechanism as claimed in claim 1, comprising a pair of sliding rods loosely attached to the rocking arm and a special attachment connecting the sliding rods to the tone arm in such a manner that the movement of the tone arm towards the centre of the disc is in unison with the travel of the rocking arm towards the centre of the machine.

10. The combination with mechanism in or for use with a sound recording or reproducing machine of the disc type for varying the speed of rotation of the disc supporting turntable in accordance with the movement of the stylus over a disc on the turntable so that the linear speed of the disc under the stylus shall be constant, said mechanism comprising a turntable, a splined shaft substantially perpendicular to the axis of the turntable and rotatable upon fixed bearings, and a friction wheel carried by the splined shaft and rotatable therewith for driving the turntable; of an arm also carried by the splined shaft and engaging with the friction wheel to impart axial movement thereto along the splined shaft, and a threaded shaft parallel to the splined shaft and rotatable upon fixed bearings, said arm having a portion engageable with said threaded shaft to cause movement of the arm and thereby the friction wheel along the splined shaft upon rotation of the threaded shaft, said arm being rotatable about the splined shaft upon which it is carried as a pivotal axis, to bring the engaging portion of the arm into or out of driving engagement with the threaded shaft.

JOHN GELL.